UNITED STATES PATENT OFFICE.

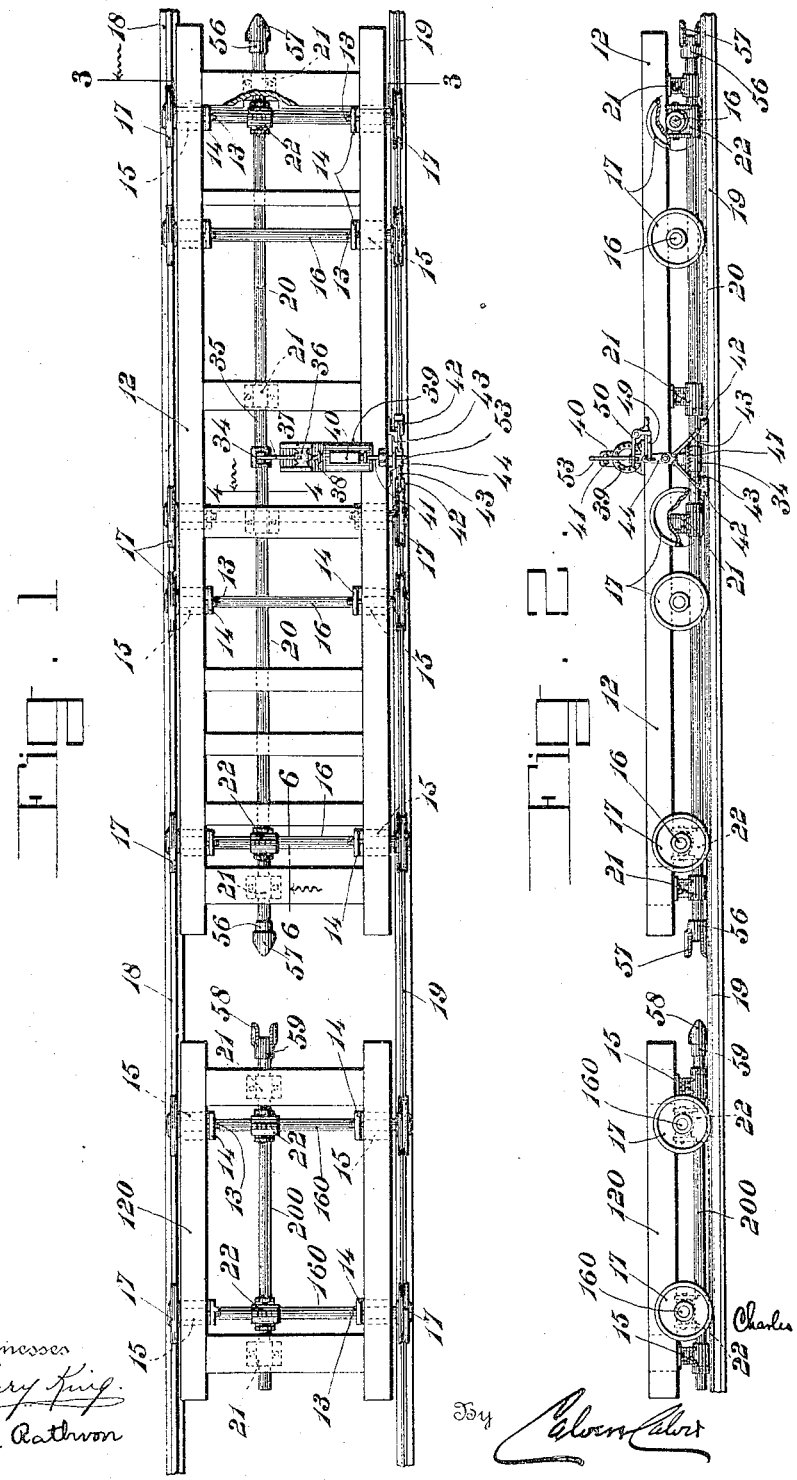

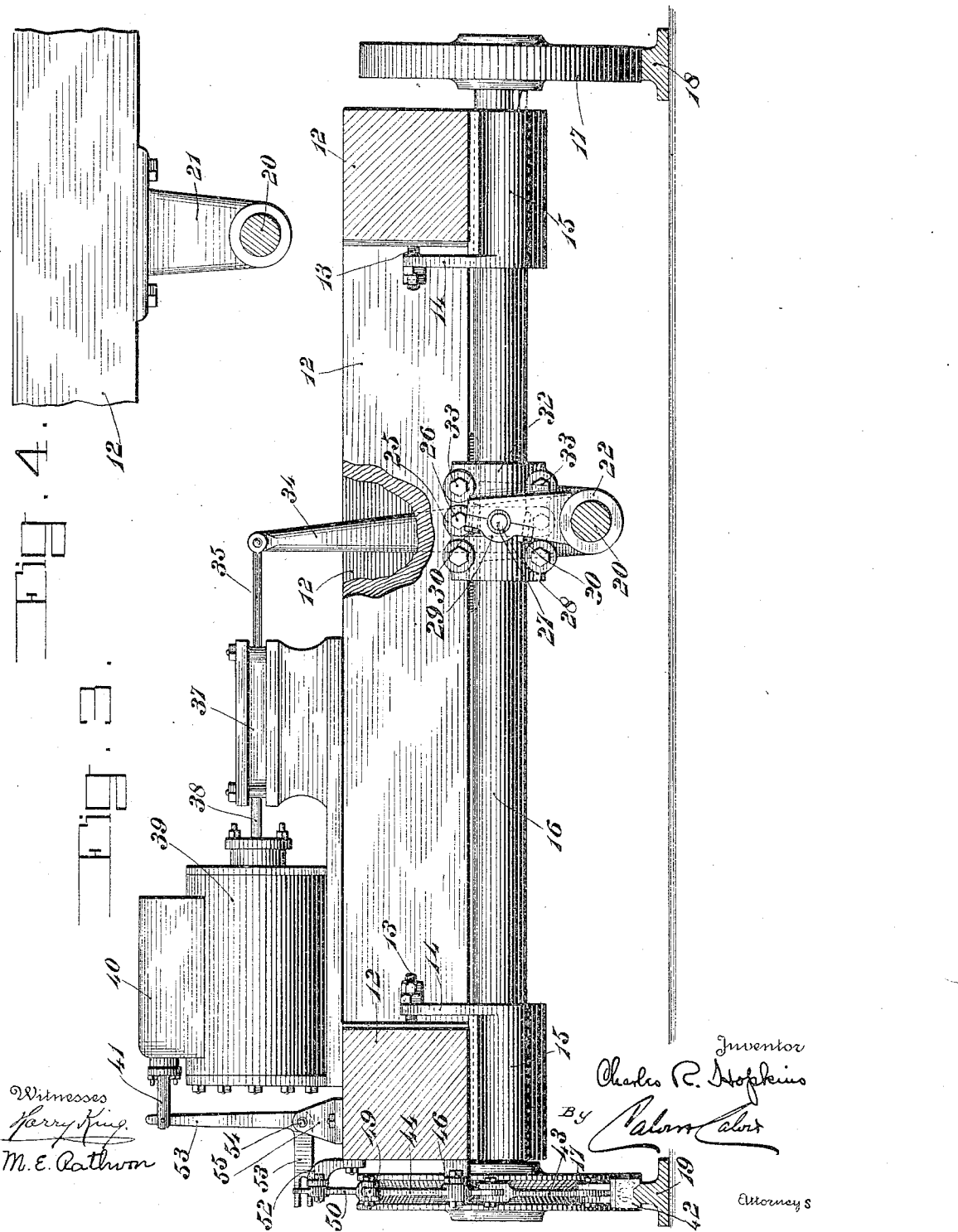

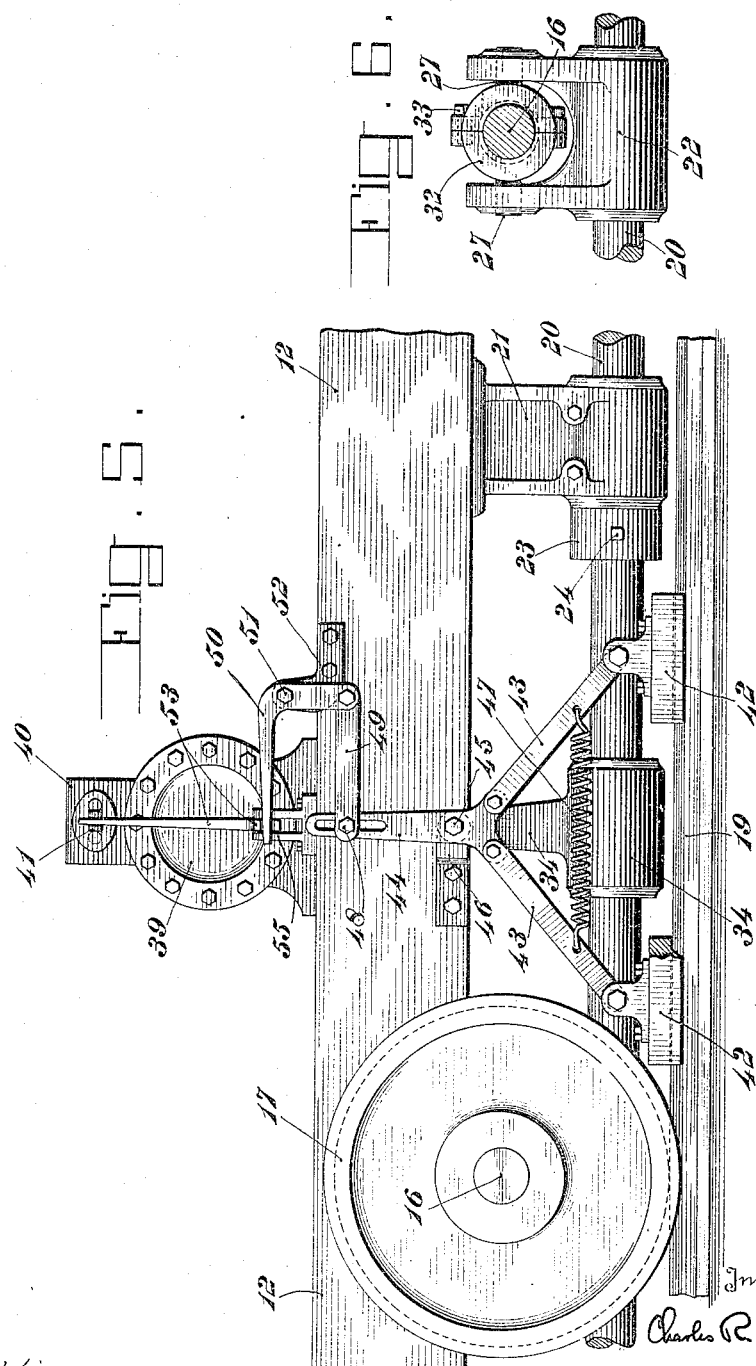

CHARLES R. HOPKINS, OF DOBBIN, WEST VIRGINIA, ASSIGNOR OF ONE-HALF TO BURTON WILSON, OF MILL CREEK, WEST VIRGINIA.

OFFSET MECHANISM FOR SAWMILL-CARRIAGES.

1,122,755.  Specification of Letters Patent.  Patented Dec. 29, 1914.

Application filed April 8, 1914. Serial No. 830,426.

*To all whom it may concern:*

Be it known that I, CHARLES R. HOPKINS, a citizen of the United States, residing at Dobbin, in the county of Grant and State of West Virginia, have invented or discovered certain new and useful Improvements in Offset Mechanism for Sawmill-Carriages, of which the following is a specification, reference being had therein to the accompanying drawings.

This invention relates to saw mills of the well known type comprising a saw and a traveling or reciprocating carriage which is moved in one direction to feed the work to the saw and thereafter reversed or moved in the opposite direction to return the work into a position for starting another cut. In machines of this character, particularly those employing a band saw, it is necessary, when the carriage is reversed upon the completion of the cut, to offset the work slightly, or move the same laterally away from the saw, in order that on its return movement the work may not engage or catch upon the saw and thereby injure said saw or disengage the same from its wheels.

The present invention has for its general object to provide simple, practical, efficient and inexpensive offset mechanism for such saw mill carriages, and more particularly to provide such a mechanism which is positively and automatically operated, which is readily applicable to saw mill carriages of substantially any well-known type without material modification of the carriage structure, which will operate with certainty immediately upon reversal of the direction of movement of the carriage, so that such carriage may be reversed at once upon the completion of the cut, but which will not improperly operate at any other time, as when the carriage is for any reason stopped before completing the cut, which requires no attention on the part of the operator when in use, which has no wearing parts which are not easily adjustable to take up lost motion, and which does not impose unnecessary wear upon the carriage wheels or track.

The foregoing and other objects of the invention, together with means whereby the same may be carried into effect, will best be understood from the following description of one form or embodiment thereof illustrated in the accompanying drawings.

It will be understood, however, that the particular construction described and shown has been chosen for illustrative purposes merely, and that the invention, as defined by the claims hereunto appended, may be otherwise embodied and practised without departing from the spirit and scope thereof.

In said drawings: Figure 1 is a plan view of the complete carriage and associated parts; Fig. 2 is a side elevation thereof; Fig. 3 is an enlarged transverse section on the line 3—3, Fig. 1; Fig. 4 is a detail sectional view on the line 4—4, Fig. 1; Fig. 5 is an enlarged side elevation of the valve operating mechanism; Fig. 6 is a detail sectional view on the line 6—6, Fig. 1.

12 denotes the carriage frame which may be of any suitable form and size and which is provided with the usual means (not shown) for supporting and moving the log or other work.

Secured to the frame 12, as by bolts 13, are brackets 14 having sleeve or bearing portions 15 in which are journaled the axles 16 of the carriage wheels 17. The sleeves or bearings 15 are slidably mounted on the axles 16, which are of sufficient length to permit a slight lateral movement of the frame 12 upon said axles. The wheels 17 run upon a suitably disposed track which, as is usual in such apparatus, comprises a flat rail 18 at the side toward the saw and a beveled or V-shaped rail 19, the peripheries of the several wheels 17 being suitably formed to coöperate with said rails respectively.

20 denotes a rock shaft extending longitudinally of the carriage beneath the axles 16 and journaled in hangers 21 bolted to and depending from the frame 12. The shaft 20 is preferably held against longitudinal movement by means of collars 23 (see Fig. 5) secured to said shaft, as by set screws 24, and which engage certain of the hangers 21. 22 denotes yokes keyed or otherwise fixed upon the shaft 20 adjacent to the axles 16 and having arms arranged at opposite sides of said axles respectively.

Any suitable number of yokes 22 may be employed in accordance with the number of axles 16, but preferably, and as herein shown, only two are provided adjacent to the two end axles respectively.

25 denotes collars loosely or rotatably mounted on the axles 16 adjacent to the yokes 22, said collars being formed in sections and being removably held in assembled position about said axles by means of bolts 26 which pass through perforated ears formed on the several sections. The collars 25 are provided with trunnions 27 mounted in bushings 28 which are clamped to the arms of the yokes 22 by means of cap plates 29 detachably secured to said arms as by bolts 30. By removing the caps 29 the bushings 28 may be removed and replaced when necessary by reason of the wear of the parts.

32 denotes normally fixed collars also formed in sections detachably clamped in place on the axles 16 by bolts 33 which pass through perforated ears formed on the sections of said collars. The collars 33 are arranged in pairs on opposite sides of the collars 25, respectively, and hold said last named collars against longitudinal movement on the axles 16. By suitably adjusting the position of the collars 32 any wear between said collars and the collars 25 may be readily taken up. The sectional or detachable character of the collars 25 and 32 makes it possible to apply this portion of the mechanism to any existing carriage without disassembling said carriage in any way.

The collars 25 with their trunnions 27 being held against movement longitudinally of the axles 16, it will be seen that the upper ends of the arms of the yokes 22 are held against movement transversely of the carriage, so that rocking of the shaft 20 will cause said shaft to be moved bodily transversely of the carriage, and, by reason of the fact that said shaft is mounted in journals fixed to the frame 12, will cause said frame to be shifted transversely or moved longitudinally of the axle 16. In order to permit the slight vertical movement of the trunnions 27 necessitated by the rocking movement of the arms of the yokes 22, the collars 25 are made of an interior diameter slightly greater than the exterior diameter of the axles 16, as indicated by dotted lines in Fig. 6.

The particular means above described for connecting the rock shaft 20 and axles 16 are not claimed herein, being covered by the claims of another application filed Nov. 11, 1914; Serial No. 871,466.

For rocking the shaft 20 in order to shift the carriage said shaft is provided, preferably substantially at midlength or midway between the end axles 16, with an operating arm 34 having a hub or sleeve portion keyed or otherwise fixed to said shaft. By reason of the central arrangement of the operating arm 34 by which the shaft 20 is rocked it will be seen that any torsional spring or yield of said shaft will be equally distributed to the end axles with which said shaft is operatively connected by the mechanism last described.

The upper end of the arm 34 is connected by a pitman 35 with a slide 36 mounted in guides 37 secured to the frame 12. The slide 36 is reciprocated in the guides 37 by means of a piston rod 38 connected with a piston (not shown) in a steam or other fluid pressure cylinder 39 also mounted on the frame 12.

The admission of fluid pressure to the opposite ends of the cylinder 39, and consequently the movements of the piston therein and of the arm 34 and rock shaft 20, is controlled by means of an ordinary slide valve (not shown) in a valve box or chamber 40 mounted on the cylinder 39, and to which steam or other fluid pressure may be supplied from any suitable source, said valve being provided with a stem 41 projecting from said valve box or chamber. These parts are not shown in detail as they may be of any usual or well known form or construction.

As will be seen, by shifting the valve in the chamber 40 the piston in the cylinder 39 will be moved in one direction or the other, thereby, through the connections above described, causing the shaft 20 to be rocked and the frame 12 to be shifted laterally in one direction or the other in accordance with the direction of movement of said piston. For controlling said valve and for causing the same to be shifted when the direction of travel of the carriage is reversed the following mechanism is provided.

42 denotes a pair of friction shoes mounted to slide on the rail 19. The shoes 42 are connected by oppositely inclined links 43 to the short lower arms of a three armed lever 44 pivoted at 45 to a bracket 46 bolted or otherwise secured to the side of the frame 12. The links 43 are connected by a spring 47 which tends to draw said links and the shoes 42 toward one another, thereby pressing said shoes against the rail 19. By this arrangement it will be seen that the pressure of the shoes 42 against the rail is evenly distributed between both of said shoes, which therefore engage said rail with substantially the same pressure at all times irrespective of the position of the parts. This pressure, being steady, can be so designed or arranged as to cause the valve to be properly operated, as hereinafter explained, without being at any time excessive, so that unnecessary wear of the track at the points where the reversal of the travel of the carriage usually takes place is avoided. The third or upper arm of the lever 44 is formed with a slotted end to which is adjustably connected, by means of a suitably shouldered bolt 48, one end of a link 49 pivoted at its opposite end to the lower arm of a bell crank lever 50 fulcrumed at 51 upon a bracket 52 bolted or otherwise secured to the side of the frame. By adjusting the connection of the link 49 with the lever 44 the stroke of the valve stem 41 may be controlled and any lost motion occasioned by the wear of the parts overcome. The upper arm of the bell-crank lever 50 engages at its end the bifurcated end of the lower arm of the second bell-crank lever 53 arranged at right angles to the lever 50 and pivoted to a bracket 55 bolted or otherwise secured to the frame 12. The upper arm of the lever 53 is pivoted at its upper end to the bifurcated end of the valve stem 41.

As will now be seen when the direction of travel of the carriage is reversed frictional engagement of the shoes 42 with the rail 19 will cause reversal of the movement of said shoes to be momentarily retarded, thereby causing the lever 44 to be turned on its pivot in one direction or the other and, through the link 49, bell-crank levers 50 and 53 and valve stem 41, causing the controlling valve to be shifted, which, as above explained, results in the shifting or offsetting of the frame 12 upon the axles 16. The arrangement of parts is of course such as to cause the frame 12 to be shifted away from the saw when the direction of movement of the carriage is reversed from forward to backward at the completion of the cut and to cause said frame to be returned to its initial position upon reversal of movement of the carriage from backward to forward at the beginning of a new cut.

As the offsetting mechanism is operated by the frictional engagement of the shoes 42 with the rail 19 it will be seen that the shifting of the carriage cannot take place without reversing the direction of travel thereof, so that said shifting will not take place should the carriage be suddenly stopped in the middle of a cut with the resulting injury to the saw such as is likely to occur with offset mechanism operated by inertia or momentum of the parts. It will also be seen, however, that, immediately upon reversal of the direction of movement of the carriage, the offset mechanism is at once operated, so that said carriage may be reversed immediately upon the completion of the cut irrespective of the length thereof.

The offset mechanism above described is well adapted for use in connection with saw mill carriages provided with trailers.

As shown in Figs. 1 and 2, 120 denotes a trailer frame similar to the frame 12 and similarly mounted for lateral movement upon axles 160. 200 denotes a rock shaft carried by the trailer, corresponding in function and arrangement to the rock shaft 20, and connected with the axles 160 by mechanism similar to that above described for connecting the rock shaft 20 and axles 16. The shaft 20 is provided at its end with fast collars 56 provided with longitudinally extending arms 57 adapted to engage similar arms 58 on a collar 59 secured to the end of rock shaft 200. When the trailer is brought into operative position with respect to the main carriage the coupling formed by the arms 57 and 58 is automatically connected, thereby connecting the shafts 20 and 200, whereby the offset mechanism of the trailer will be operated by the main offset mechanism on the main carriage to shift the frame 120 in unison with the frame 12. The ends of the arms 57 and 58 are preferably tapered as shown so that when the trailer and main carriage are brought together the coupling of the shafts 20 and 200 will be automatically effected, the shaft 200 being rocked if necessary should the carriage 120 not be in a lateral position corresponding to the lateral position of the carriage 12. The arms 57 and 58 may be freely disengaged upon separation of the carriage and trailer.

As will be seen, the above described offset mechanism may be readily applied to any existing carriage having provision for the necessary lateral movement without any reconstruction of the frame or axles, or other material modification of the carriage structure, and without even removing the wheels from the axles or the axles from the carriage, the various parts of the mechanism being merely bolted or otherwise attached, as above described, to the proper parts of the carriage.

Having thus described my invention, I claim:

1. In an apparatus of the character described, the combination with a saw mill carriage provided with offset mechanism including a rock shaft, of a trailer provided with offset mechanism including a rock shaft, and means for automatically coupling said rock shafts for angular movement in unison when said trailer and carriage are brought together, said means permitting automatic disconnection of said parts when said carriage and trailer are separated.

2. In an apparatus of the character described, the combination with a saw mill carriage provided with offset mechanism including a rock shaft, of a trailer provided with offset mechanism including a rock-shaft, and collars on the ends of said shafts each provided with longitudinally extending arms adapted automatically to interengage when said trailer and carriage are brought together to couple said rock-shafts for angular movement in unison.

3. In an apparatus of the character described, the combination with a saw mill carriage provided with offset mechanism including a rock-shaft, of a trailer provided with offset mechanism including a rock-shaft, and collars on the ends of said shafts each provided with longitudinally extending arms having tapered ends adapted to interengage when said trailer and carriage are brought together to couple said rock-shafts and to move the rock-shaft on said trailer into an angular position corresponding to that of the rock-shaft on said carriage.

4. In an apparatus of the character described, the combination with a saw mill carriage provided with offset mechanism including a rock-shaft, of a trailer provided with offset mechanism including a rock-shaft, and means for automatically coupling said rock-shafts for angular movement in unison when said trailer and carriage are brought together and for simultaneously moving said rock-shafts into corresponding angular positions.

5. The combination with a track comprising a pair of rails and a carriage mounted to travel on said track, of offset mechanism for said carriage, means for controlling said offset mechanism, a pair of friction shoes coöperating with one of said rails and operatively connected with said controlling means, and means for causing both of said shoes to engage said rail with substantially equal pressure irrespective of the position of the parts.

6. The combination with a track comprising a pair of rails and a carriage mounted to travel on said track, of offset mechanism for said carriage, and means for controlling said offset mechanism comprising a pair of friction shoes coöperating with one of said rails, a lever pivoted to said carriage, oppositely inclined links connecting said shoes and lever, and a spring connecting said links.

7. The combination with a track comprising a pair of rails and a carriage mounted to travel on said track, of offset mechanism for said carriage, controlling mechanism for said offset mechanism, means engaging one of said rails, a lever pivoted to said carriage and operatively connected with said rail engaging means, said lever having a slotted arm, a second lever operatively connected with said controlling mechanism, and a link pivoted to said last-named lever and adjustably connected to the slotted arm of said first-named lever.

8. The combination with a track comprising a pair of rails and a carriage mounted to travel on said track, of offset mechanism for said carriage including a rock shaft, a fluid pressure cylinder and connections for actuating said rock shaft, a valve for controlling the admission of fluid pressure to said cylinder, a pair of friction shoes coöperating with one of said rails, a lever pivoted to said carriage and having a slotted arm, oppositely inclined links connecting said shoes and lever, a spring connecting said links, a second lever operatively connected with said valve, and a link pivoted to said last named lever and adjustably connected to the slotted arm of said first-named lever.

9. The combination with a track comprising a pair of rails and a carriage mounted to travel on said track, of offset mechanism for said carriage, means for controlling said offset mechanism, means coöperating with one of said rails, a bell-crank lever pivoted to said carriage, one arm of said lever being connected with said controlling means and the other arm of said lever having a bifurcated end, a second bell-crank lever pivoted to said carriage at right angles to said first-named lever, one arm of said last-named lever engaging the bifurcated end of the arm of said first-named lever, and means connecting the other arm of said last-named lever with said rail engaging means.

10. The combination with a track comprising a pair of rails and a carriage mounted to travel on said track, of offset mechanism for said carriage, means for controlling said offset mechanism, means engaging one of said rails, a bell-crank lever pivoted to said carriage, one arm of said lever being connected with said controlling means and the other arm of said lever having a bifurcated end, a second bell-crank lever pivoted to said carriage at right angles to said first-named lever, one arm of said second lever engaging the bifurcated end of the arm of said first-named lever, a third lever pivoted to said carriage and operatively connected with said rail engaging means, said last-named lever having a slotted arm, and a link pivoted to said second lever and adjustably connected to the slotted arm of said last-named lever.

11. The combination with a track comprising a pair of rails and a carriage mounted to travel on said track, of offset mechanism for said carriage, a fluid pressure cylinder and connections for actuating said offset mechanism, a valve for controlling the admission of fluid pressure to said cylinder, said valve having a stem, a pair of friction shoes coöperating with one of said rails, a lever pivoted to said carriage, oppositely inclined links connecting said shoes and lever, a spring connecting said links, a pair of connected bell-crank levers pivoted to said carriage, one of said levers being connected to said valve stem, and a link connecting the other of said bell-crank levers with said first-named lever.

12. The combination with a track and a carriage mounted to travel on said track, of offset mechanism for said carriage, means for controlling said offset mechanism, means frictionally engaging said track and operatively connected with said controlling means, and means for causing said friction means to engage said track with substantially constant pressure irrespective of the position of the parts.

In testimony whereof I affix my signature, in presence of two witnesses.

CHARLES R. HOPKINS.

Witnesses:
JAMES B. HOPKINS,
WILLIAM E. WILSON.

Copies of this patent may be obtained for five cents each, by addressing the "Commissioner of Patents, Washington, D. C."